US012804748B2

(12) United States Patent
Vemuri et al.

(10) Patent No.: US 12,804,748 B2
(45) Date of Patent: Nov. 17, 2026

(54) SYSTEM AND METHOD FOR NETWORK RESOURCE OPTIMIZATION

(71) Applicant: GM Global Technology Operations LLC, Detroit, MI (US)

(72) Inventors: Venkata Naga Siva Vikas Vemuri, Farmington Hills, MI (US); Paolo Giusto, Brentwood, CA (US); Arun Adiththan, Sterling Heights, MI (US); Angelos Angelopoulos, Carrboro, NC (US); Md Mhafuzul Islam, Warren, MI (US); John Sergakis, Bloomfield Hills, MI (US); Andrew J. MacDonald, Grosse Pointe Park, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 414 days.

(21) Appl. No.: 18/414,828

(22) Filed: Jan. 17, 2024

(65) Prior Publication Data

US 2025/0234403 A1 Jul. 17, 2025

(51) Int. Cl.
*H04W 76/15* (2018.01)
*H04W 24/02* (2009.01)

(52) U.S. Cl.
CPC ........... *H04W 76/15* (2018.02); *H04W 24/02* (2013.01)

(58) Field of Classification Search
CPC . H04W 76/15; H04W 52/0206; H04W 24/02; H04L 47/76; H04L 47/78; H04L 67/12; G06F 9/5066; G06F 9/5088; G06F 9/5094; G06F 9/5044; G06F 9/505; G06F 9/54; G06F 2209/5019; G06F 2209/503; G06F 2209/509; G07C 5/008; G06N 20/00
USPC ........................................ 370/252, 338, 329
See application file for complete search history.

(56) References Cited

U.S. PATENT DOCUMENTS

2003/0203716 A1* 10/2003 Takahashi ............ H04B 7/2606 455/11.1
2012/0158820 A1* 6/2012 Bai ........................ G07C 5/008 709/202
2018/0146471 A1* 5/2018 Xu .......................... H04W 4/08
2019/0141142 A1* 5/2019 Filippou ................. H04W 4/40
(Continued)

FOREIGN PATENT DOCUMENTS

CN 116991502 A * 11/2023 ............. G06F 9/445
DE 102023101315 A1 1/2024
DE 102023110027 A1 4/2024

OTHER PUBLICATIONS

Angelopoulos, A., et al. U.S. Appl. No. 18/461,682, filed Sep. 6, 2023.
U.S. Appl. No. 18/461,682, filed Sep. 6, 2023.

*Primary Examiner* — Ricardo H Castaneyra
(74) *Attorney, Agent, or Firm* — Vivacqua Crane, PLLC

(57) ABSTRACT

A method for network resource optimization may include selecting a first leader device from a plurality of wireless devices in wireless communication. The first leader device is in wireless communication with at least one follower device of the plurality of wireless devices. The method further may include transferring a follower data processing task from the at least one follower device to the first leader device. The follower data processing task includes at least one of: a computation task and a communication task. The method further may include performing the follower data processing task using the first leader device.

11 Claims, 3 Drawing Sheets

(56) References Cited

U.S. PATENT DOCUMENTS

| | | | | |
|---|---|---|---|---|
| 2021/0219116 | A1* | 7/2021 | Perras | H04W 4/40 |
| 2022/0116456 | A1 | 4/2022 | Higuchi et al. | |
| 2023/0107301 | A1* | 4/2023 | Moradi | H04L 41/30<br>706/12 |
| 2023/0185614 | A1 | 6/2023 | Chhajer | |

* cited by examiner

SYSTEM AND METHOD FOR NETWORK RESOURCE OPTIMIZATION

INTRODUCTION

The present disclosure relates to systems and methods for network resource optimization, and more particularly, to systems and methods for optimizing offloading of computation and communication tasks to remote computing resources.

To increase occupant awareness and convenience, vehicles and/or mobile devices may be equipped with various sensors and systems such as, for example, perception sensors (e.g., camera, radar, ultrasonic distance sensors, and/or the like), microphones, navigation systems, advanced driver assistance systems (ADAS), automated driving systems (ADS), and/or the like. Such sensors and systems may produce data requiring execution of further computational tasks, such as, for example, computer vision processing, video processing, natural language processing, voice recognition, navigation routing, automated driving path planning, and/or the like. Therefore, computational tasks may be offloaded to remote computing resources (e.g., a remote datacenter). However, some vehicles and/or mobile devices may lack computational and/or communication capabilities required to coordinate offloading and/or transmit tasks and associated data to remote computing resources. As a result, current offloading systems may not optimally allocate remote computing resources.

Thus, while current computation systems and methods achieve their intended purpose, there is a need for a new and improved system and method for network resource optimization.

SUMMARY

According to several aspects, a method for network resource optimization is provided. The method may include selecting a first leader device from a plurality of wireless devices in wireless communication. The first leader device is in wireless communication with at least one follower device of the plurality of wireless devices. The method further may include transferring a follower data processing task from the at least one follower device to the first leader device. The follower data processing task includes at least one of: a computation task and a communication task. The method further may include performing the follower data processing task using the first leader device.

In another aspect of the present disclosure, selecting the first leader device further may include determining a leader matrix. The leader matrix includes one or more candidate leader devices. Each of the one or more candidate leader devices is one of the plurality of wireless devices. The leader matrix is determined based at least in part on at least one of: a data processing task capacity of each of the plurality of wireless devices and a historic performance reliability of each of the plurality of wireless devices. Selecting the first leader device further may include selecting the first leader device from the leader matrix.

In another aspect of the present disclosure, determining the leader matrix further may include determining the data processing task capacity of each of the plurality of wireless devices. The data processing task capacity of each of the plurality of wireless devices is determined using a capacity estimation machine learning model. The data processing task capacity includes at least one of: a computation capacity and a communication capacity. Determining the leader matrix further may include determining the historic performance reliability of each of the plurality of wireless devices. Determining the leader matrix further may include selecting the one or more candidate leader devices from the plurality of wireless devices based at least in part on the data processing task capacity of each of the plurality of wireless devices and the historic performance reliability of each of the plurality of wireless devices. Determining the leader matrix further may include determining the leader matrix based at least in part on the one or more candidate leader devices.

In another aspect of the present disclosure, determining the leader matrix further may include determining the leader matrix, where the leader matrix is a ranked list including each of the one or more candidate leader devices. A ranking order of the leader matrix is determined based at least in part on the data processing task capacity and the historic performance reliability of each of the one or more candidate leader devices.

In another aspect of the present disclosure, selecting the first leader device from the leader matrix further may include determining a scheduled data processing task capacity for each of the one or more candidate leader devices. The scheduled data processing task capacity of each of the one or more candidate leader devices is determined using a capacity prediction machine learning model. Selecting the first leader device from the leader matrix further may include determining the ranking order of the leader matrix based at least in part on the scheduled data processing task capacity for each of the one or more candidate leader devices.

In another aspect of the present disclosure, determining the leader matrix further may include calculating a cost for each of the one or more candidate leader devices using a cost function:

$$t_c = (t_0 * z) + P_0$$

$$t_0 = \frac{\frac{r_{c,Mb}}{c_{c,Mb}}}{i} * \int i(t)dt$$

where $t_c$ is the cost, $t_0$ is a quantity of interactions allowed within a given time period without exceeding a device low power limit, z is a total cost of performing $t_0$ interactions within the given time period, $P_0$ is a cost per unit of power consumed within the given time period, $r_{c,Mb}$ is a cost of transferring one megabyte of registration information within the given time period, $c_{c,Mb}$ is a cost of transferring one megabyte of payload data within the given time period, i is a quantity of interactions performed within the given time period, and $\int i(t)dt$ is an integral of i evaluated over multiple time periods. Determining the leader matrix further may include determining the ranking order of the leader matrix based at least in part on the cost for each of the one or more candidate leader devices.

In another aspect of the present disclosure, transferring the follower data processing task further may include transferring the computation task from the at least one follower device to the first leader device. The computation task includes an offloading optimization computation task. Transferring the follower data processing task further may include transferring the communication task from the at least one follower device to the first leader device. The communication task includes a server uplink communication task.

In another aspect of the present disclosure, transferring the follower data processing task further may include identifying an obstruction impeding transmission between a first follower device and the first leader device. Transferring the follower data processing task further may include relaying the follower data processing task from the first follower device through a second follower device to the first leader device to avoid the obstruction.

In another aspect of the present disclosure, transferring the computation task further may include transferring the offloading optimization computation task from the at least one follower device to the first leader device. The offloading optimization computation task includes execution of a device specific offloading machine learning model.

In another aspect of the present disclosure, performing the follower data processing task further may include determining a data processing task capacity of the first leader device. Performing the follower data processing task further may include transferring the follower data processing task to a second leader device based at least in part on the data processing task capacity of the first leader device.

According to several aspects, a system for network resource optimization for a vehicle is provided. The system may include a first follower vehicle including a follower vehicle communication system. The system further may include a follower vehicle controller in electrical communication with the follower vehicle communication system. The follower vehicle controller is programmed to establish a first wireless connection with a leader vehicle using the follower vehicle communication system. The follower vehicle controller is programmed to transfer a follower data processing task to the leader vehicle using the follower vehicle communication system and the first wireless connection.

In another aspect of the present disclosure, to establish the first wireless connection with the leader vehicle, the follower vehicle controller is further programmed to determine a leader matrix. The leader matrix includes one or more candidate leader vehicles. The leader matrix is determined based at least in part on at least one of: a data processing task capacity of each of a plurality of vehicles and a historic performance reliability of each of the plurality of vehicles. To establish the first wireless connection with the leader vehicle, the follower vehicle controller is further programmed to select the leader vehicle from the leader matrix.

In another aspect of the present disclosure, to determine the leader matrix, the follower vehicle controller is further programmed to determine the data processing task capacity of each of a plurality of vehicles. The data processing task capacity of each of the plurality of vehicles is determined using a capacity estimation machine learning model. The data processing task capacity includes at least one of: a computation capacity and a communication capacity. To determine the leader matrix, the follower vehicle controller is further programmed to determine the historic performance reliability of each of the plurality of vehicles. To determine the leader matrix, the follower vehicle controller is further programmed to select the one or more candidate leader vehicles from the plurality of vehicles based at least in part on the data processing task capacity of each of the plurality of vehicles and the historic performance reliability of each of the plurality of vehicles. To determine the leader matrix, the follower vehicle controller is further programmed to determine the leader matrix based at least in part on the one or more candidate leader vehicles. The leader matrix is a ranked list including each of the one or more candidate leader vehicles. A ranking order of the leader matrix is determined based at least in part on the data processing task capacity and the historic performance reliability of each of the one or more candidate leader vehicles.

In another aspect of the present disclosure, to select the leader vehicle from the leader matrix, the follower vehicle controller is further programmed to determine a scheduled data processing task capacity for each of the one or more candidate leader vehicles. The scheduled data processing task capacity of each of the one or more candidate leader vehicles is determined using a capacity prediction machine learning model. To select the leader vehicle from the leader matrix, the follower vehicle controller is further programmed to calculate a cost for each of the one or more candidate leader vehicles using a cost function:

$$t_c = (t_0 * z) + P_0$$

$$t_0 = \frac{\frac{r_{c,Mb}}{c_{c,Mb}}}{i} * \int i(t)dt$$

where $t_c$ is the cost, $t_0$ is a quantity of interactions allowed within a given time period without exceeding a device low power limit, z is a total cost of performing $t_0$ interactions within the given time period, $P_0$ is a cost per unit of power consumed within the given time period, $r_{c,Mb}$ is a cost of transferring one megabyte of registration information within the given time period, $c_{c,Mb}$ is a cost of transferring one megabyte of payload data within the given time period, i is a quantity of interactions performed within the given time period, and $\int i(t)dt$ is an integral of i evaluated over multiple time periods. To select the leader vehicle from the leader matrix, the follower vehicle controller is further programmed to determine the ranking order of the leader matrix based at least in part on the scheduled data processing task capacity for each of the one or more candidate leader vehicles and the cost for each of the one or more candidate leader vehicles.

In another aspect of the present disclosure, to transfer the follower data processing task to the leader vehicle, the follower vehicle controller is further programmed to transfer an offloading optimization computation task from to the leader vehicle using the follower vehicle communication system. The offloading optimization computation task includes execution of a vehicle specific offloading machine learning model.

In another aspect of the present disclosure, the system further includes the leader vehicle including a leader vehicle communication system and a leader vehicle controller in electrical communication with the leader vehicle communication system. The leader vehicle controller is programmed to establish a first wireless connection with the first follower vehicle using the leader vehicle communication system. The leader vehicle controller is further programmed to receive a follower data processing task from the first follower vehicle using the leader vehicle communication system and the first wireless connection. The leader vehicle controller is further programmed to establish a second wireless connection with a server system using the leader vehicle communication system. The leader vehicle controller is further programmed to perform the follower data processing task using the leader vehicle communication system and the second wireless connection.

In another aspect of the present disclosure, to receive the follower data processing task from the first follower vehicle, the leader vehicle controller is further programmed to identify an obstruction impeding transmission between the first follower vehicle and the leader vehicle. To receive the follower data processing task from the first follower vehicle, the leader vehicle controller is further programmed to terminate the first wireless connection between the leader vehicle and the first follower vehicle in response to identifying the obstruction.

According to several aspects, a method for network resource optimization for a vehicle is provided. The method may include selecting a first leader vehicle from a plurality of vehicles in wireless communication. The first leader vehicle is in wireless communication with at least one follower vehicle of the plurality of vehicles. The method further may include transferring a follower data processing task from the at least one follower vehicle to the first leader vehicle. The follower data processing task includes execution of a vehicle specific offloading machine learning model. The method further may include performing the follower data processing task using the first leader vehicle.

In another aspect of the present disclosure, selecting the first leader vehicle further may include determining a leader matrix. The leader matrix includes one or more candidate leader vehicles. Each of the one or more candidate leader vehicles is one of the plurality of vehicles. The leader matrix is determined based at least in part on at least one of: a data processing task capacity of each of the plurality of vehicles and a historic performance reliability of each of the plurality of vehicles. Selecting the first leader vehicle further may include selecting the first leader vehicle from the leader matrix.

In another aspect of the present disclosure, determining the leader matrix further may include determining the data processing task capacity of each of the plurality of vehicles. The data processing task capacity of each of the plurality of vehicles is determined using a capacity estimation machine learning model. The data processing task capacity includes at least one of: a computation capacity and a communication capacity. Determining the leader matrix further may include determining the historic performance reliability of each of the plurality of vehicles. Determining the leader matrix further may include selecting the one or more candidate leader vehicles from the plurality of vehicles based at least in part on the data processing task capacity of each of the plurality of vehicles and the historic performance reliability of each of the plurality of vehicles. Determining the leader matrix further may include calculating a cost for each of the one or more candidate leader vehicles using a cost function:

$$t_c = (t_0 * z) + P_0$$

$$t_0 = \frac{\frac{r_{c,Mb}}{c_{c,Mb}}}{i} * \int i(t)dt$$

where $t_c$ is the cost, $t_0$ is a quantity of interactions allowed within a given time period without exceeding a device low power limit, z is a total cost of performing $t_0$ interactions within the given time period, $P_0$ is a cost per unit of power consumed within the given time period, $r_{c,Mb}$ is a cost of transferring one megabyte of registration information within the given time period, $c_{c,Mb}$ is a cost of transferring one megabyte of payload data within the given time period, i is a quantity of interactions performed within the given time period, and $\int i(t)dt$ is an integral of i evaluated over multiple time periods. Determining the leader matrix further may include determining the leader matrix based at least in part on the one or more candidate leader vehicles. The leader matrix is a ranked list including each of the one or more candidate leader vehicles. A ranking order of the leader matrix is determined based at least in part on the data processing task capacity, the historic performance reliability of each of the one or more candidate leader vehicles, and the cost for each of the one or more candidate leader vehicles.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In aspects of the present disclosure, some devices may lack computation and/or communication capabilities to accomplish particular tasks. For example, a low-power internet of thing (IoT) device may lack computational power to execute advanced machine learning algorithms. Furthermore, a low-power IoT device may lack the communication capability to establish connections with external servers using a cellular data connection. Therefore, the present disclosure provides a new and improved system and method for network resource optimization allowing transfer of computation and/or communication tasks between devices.

Figure 1:
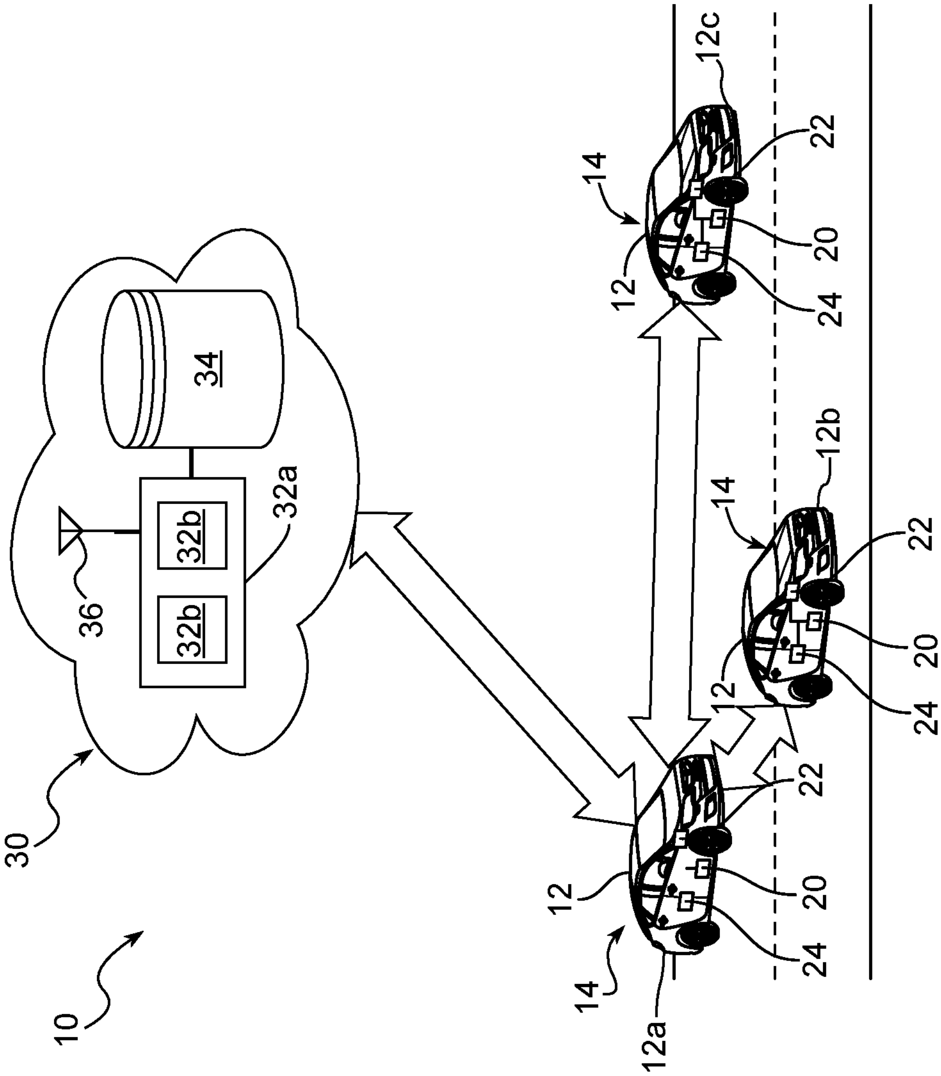
FIG. 1 is a schematic diagram of a system for network resource optimization, according to an exemplary embodiment.

Referring to FIG. 1, a system for network resource optimization is illustrated and generally indicated by reference number 10. The system 10 generally includes at least one leader device and at least one follower device. In the scope of the present disclosure, the at least one leader device and the at least one follower device may include any electronic device capable of computation and/or communication, including, for example, a smartphone, a tablet, a personal computer, a wearable device (e.g., a smart watch), a server computer, a roadside unit (RSU), a vehicle, an internet of thing (IoT) device, and/or the like. In the exemplary embodiment illustrated in FIG. 1, the at least one leader device and at least one follower device are vehicles selected from a plurality of vehicles 12. In a non-limiting example, the at least one leader device is a first leader vehicle **12*a* and the at least one follower device includes a first follower vehicle 12*b* and a second follower vehicle 12*c*. Each of the plurality of vehicles 12 includes a vehicle system 14**. While the present disclosure primarily concerns vehicles as an example, it should be understood that the present disclosure is equally applicable to any plurality of wireless devices.

The vehicle system 14 includes a vehicle controller 20, a plurality of vehicle sensors 22, and a vehicle communication system 24.

The vehicle controller 20 is used to implement a method 100 for network resource optimization, as will be described below. The vehicle controller 20 includes at least one processor and a non-transitory computer readable storage device or media. The processor may be a custom made or commercially available processor, a central processing unit (CPU), a graphics processing unit (GPU), an auxiliary processor among several processors associated with the vehicle controller 20, a semiconductor-based microprocessor (in the form of a microchip or chip set), a macroprocessor, a combination thereof, or generally a device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 20 to control various systems of the vehicle 12. The vehicle controller 20 may also consist of multiple controllers which are in electrical communication with each other. The vehicle controller 20 may be interconnected with additional systems and/or controllers of the vehicle 12, allowing the vehicle controller 20 to access data such as, for example, speed, acceleration, braking, and steering angle of the vehicle 12.

In an exemplary embodiment, capabilities of the vehicle controller 20 may vary between vehicles. Accordingly, the vehicle controller 20 of the first leader vehicle 12*a* may be referred to as a leader vehicle controller. The vehicle controller 20 of the first follower vehicle 12*b* and the second follower vehicle 12*c* may be referred to as a follower vehicle controller. In a non-limiting example, the leader vehicle controller of the first leader vehicle 12*a* includes enhanced computational capabilities, including, for example, additional random-access memory, additional processing power and/or speed, and/or the like. In a non-limiting example, the follower vehicle controller of the first follower vehicle 12*b* and the second follower vehicle 12*c* include reduced computational capabilities compared to the leader vehicle controller of the first leader vehicle 12*a*. Therefore, in aspects of the present disclosure, it is advantageous to transfer (i.e., "offload") computation tasks from the first follower vehicle 12*b* and the second follower vehicle 12*c* to the first leader vehicle 12*a*, as will be discussed in greater detail below.

The vehicle controller 20 is in electrical communication with the plurality of vehicle sensors 22 and the vehicle communication system 24. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the vehicle controller 20 are within the scope of the present disclosure.

The plurality of vehicle sensors 22 are used to acquire telemetry data of the vehicle 12. In the scope of the present disclosure, telemetry data includes, for example, engine RPM, vehicle speed, fuel level, engine temperature, odometer reading, battery voltage, brake system status, transmission data, tire pressure, GNSS location, acceleration and deceleration, steering angle, suspension system data, exhaust emission levels, diagnostic trouble codes (DTCs), airbag status, windshield wiper status, lights and indicators, and cruise control status. In exemplary embodiment, the plurality of vehicle sensors 22 includes sensors to determine performance data about the vehicle 12. In a non-limiting example, the plurality of vehicle sensors 22 further includes at least one of: a motor speed sensor, a motor torque sensor, an electric drive motor voltage and/or current sensor, an accelerator pedal position sensor, a brake position sensor, a coolant temperature sensor, a cooling fan speed sensor, a wheel speed sensor, and a transmission oil temperature sensor.

In another exemplary embodiment, the plurality of vehicle sensors 22 further includes sensors to determine information about an environment within the vehicle 12. In a non-limiting example, the plurality of vehicle sensors 22 further includes at least one of a seat occupancy sensor, a cabin air temperature sensor, a cabin motion detection sensor, a cabin camera, a cabin microphone, and/or the like.

In another exemplary embodiment, the plurality of vehicle sensors 22 further includes sensors to determine information about an environment surrounding the vehicle 12. In a non-limiting example, the plurality of vehicle sensors 22 further includes at least one of an ambient air temperature sensor, a barometric pressure sensor, a global navigation satellite system (GNSS), and/or a photo and/or video camera which is positioned to view the environment in front of the vehicle 12.

The GNSS is used to determine a geographical location of the vehicle 12. In an exemplary embodiment, the GNSS is a global positioning system (GPS). In a non-limiting example, the GPS includes a GPS receiver antenna (not shown) and a GPS controller (not shown) in electrical communication with the GPS receiver antenna. The GPS receiver antenna receives signals from a plurality of satellites, and the GPS controller calculates the geographical location of the vehicle 12 based on the signals received by the GPS receiver antenna. In an exemplary embodiment, the GNSS additionally includes a map. The map includes information about infrastructure such as municipality borders, roadways, railways, sidewalks, buildings, and the like. Therefore, the geographical location of the vehicle 12 is contextualized using the map information. In a non-limiting example, the map is retrieved from a remote source using a wireless connection. In another non-limiting example, the map is stored in a database of the GNSS. It should be understood that various additional types of satellite-based radionavigation systems, such as, for example, the Global Positioning System (GPS), Galileo, GLONASS, and the BeiDou Navigation Satellite System (BDS) are within the scope of the present disclosure. It should be understood that the GNSS may be integrated with the vehicle controller 20 (e.g., on a same circuit board with the vehicle controller 20 or otherwise a part of the vehicle controller 20) without departing from the scope of the present disclosure.

In another exemplary embodiment, at least one of the plurality of vehicle sensors 22 is a perception sensor capable of perceiving objects and/or measuring distances in the environment surrounding the vehicle 12. In a non-limiting example, the plurality of vehicle sensors 22 includes a stereoscopic camera having distance measurement capabilities. In one example, at least one of the plurality of vehicle sensors 22 is affixed inside of the vehicle 12, for example, in a headliner of the vehicle 12, having a view through a windscreen of the vehicle 12. In another example, at least one of the plurality of vehicle sensors 22 is affixed outside of the vehicle 12, for example, on a roof of the vehicle 12, having a view of the environment surrounding the vehicle 12. It should be understood that various additional types of perception sensors, such as, for example, LiDAR sensors, ultrasonic ranging sensors, radar sensors, and/or time-of-flight sensors are within the scope of the present disclosure. The plurality of vehicle sensors 22 are in electrical communication with the vehicle controller 20 as discussed above.

The vehicle communication system 24 is used by the vehicle controller 20 to communicate with other systems external to the vehicle 12. For example, the vehicle communication system 24 includes capabilities for communication with vehicles ("V2V" communication), infrastructure ("V2I" communication), remote systems at a remote call center (e.g., ON-STAR by GENERAL MOTORS) and/or personal devices. In general, the term vehicle-to-everything communication ("V2X" communication) refers to communication between the vehicle 12 and any remote system (e.g., vehicles, infrastructure, and/or remote systems). In certain embodiments, the vehicle communication system 24 is a wireless communication system configured to communicate via a wireless local area network (WLAN) using IEEE 802.11 standards or by using cellular data communication (e.g., using GSMA standards, such as, for example, SGP.02, SGP.22, SGP.32, and the like). Accordingly, the vehicle communication system 24 may further include an embedded universal integrated circuit card (eUICC) configured to store at least one cellular connectivity configuration profile, for example, an embedded subscriber identity module (eSIM) profile. The vehicle communication system 24 is further configured to communicate via a personal area network (e.g., BLUETOOTH) and/or near-field communication (NFC). However, additional or alternate communication methods, such as a dedicated short-range communications (DSRC) channel and/or mobile telecommunications protocols based on the 3rd Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 14, 15, 16 and/or future 3GPP releases are considered within the scope of the present disclosure. Accordingly, the vehicle communication system 24 may include one or more antennas and/or communication transceivers for receiving and/or transmitting signals, such as cooperative sensing messages (CSMs). The vehicle communication system 24 is configured to wirelessly communicate information between the vehicle 12 and another vehicle. Further, the vehicle communication system 24 is configured to wirelessly communicate information between the vehicle 12 and infrastructure or other vehicles. It should be understood that the vehicle communication system 24 may be integrated with the vehicle controller 20 (e.g., on a same circuit board with the vehicle controller 20 or otherwise a part of the vehicle controller 20) without departing from the scope of the present disclosure.

In an exemplary embodiment, capabilities of the vehicle communication system 24 may vary between vehicles. Accordingly, the vehicle communication system 24 of the first leader vehicle 12*a* may be referred to as a leader vehicle communication system. The vehicle communication system 24 of the first follower vehicle 12*b* and the second follower vehicle 12*c* may be referred to as a follower vehicle communication system. In a non-limiting example, the leader vehicle communication system of the first leader vehicle 12*a* includes full communication capabilities, including both local area (e.g., BLUETOOTH, WiFi, NFC, and/or the like) and wide area (e.g., cellular data) communication capabilities. In a non-limiting example, the follower vehicle communication system of the first follower vehicle 12*b* and the second follower vehicle 12*c* include reduced communication capabilities, for example, only local area communication capabilities. Therefore, in aspects of the present disclosure, it is advantageous to transfer (i.e., "offload") communication tasks requiring wide area communication from the first follower vehicle 12*b* and the second follower vehicle 12*c* to the first leader vehicle 12*a* via local area communication, as will be discussed in greater detail below.

With continued reference to FIG. 1, in an exemplary embodiment, the system 10 further includes a server system 30. The server system 30 includes a server controller 32*a* in electrical communication with a database 34 and a server communication system 36. In a non-limiting example, the server system 30 is located in a server farm, datacenter, or the like, and connected to the internet using the server communication system 36. The server controller 32*a* includes at least server processor 32*b* and a server non-transitory computer readable storage device or server media 32*c*. The description of the type and configuration given above for the vehicle controller 20 also applies to the server controller 32*a*. In some examples, the server controller 32*a* may differ from the vehicle controller 20 in that the server controller 32*a* is capable of a higher processing speed, includes more memory, includes more inputs/outputs, and/or the like. In a non-limiting example, the server processor 32*b* and server media 32*c* of the server controller 32*a* are similar in structure and/or function to the processor and the media of the vehicle controller 20, as described above. The server controller 32*a* is used in conjunction with the vehicle controller 20 to implement the method 100 for network resource optimization, as will be discussed in greater detail below. The database 34 is used to store telemetry data received from the plurality of vehicles 12, as will be discussed in greater detail below. The server communication system 36 is used to communicate with external systems, such as, for example, the vehicle controller 20 via the vehicle communication system 24. In a non-limiting example, server communication system 36 is similar in structure and/or function to the vehicle communication system 24 of the vehicle system 14, as described above. In some examples, the server communication system 36 may differ from the vehicle communication system 24 in that the server communication system 36 is capable of higher power signal transmission, more sensitive signal reception, higher bandwidth transmission, additional transmission/reception protocols, and/or the like.

Figure 2:
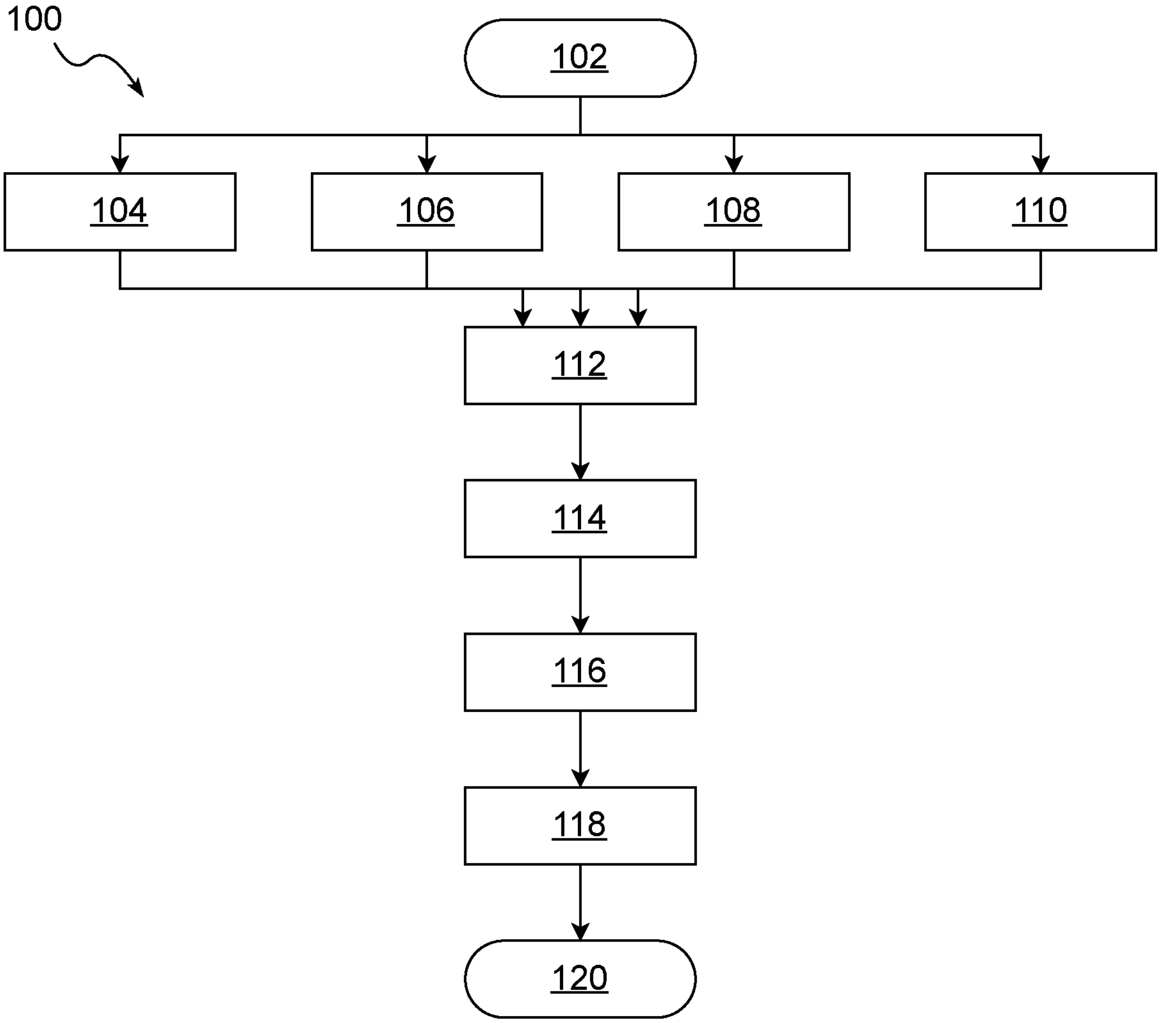
FIG. 2 is a flowchart of a method for network resource optimization, according to an exemplary embodiment.

Referring to FIG. 2, a flowchart of the method 100 for network resource optimization is shown. The method 100 begins at block 102. After block 102, the method 100 proceeds to blocks 104, 106, 108, and 110. At block 104, a data processing task capacity of each of the plurality of vehicles 12 is determined. In the scope of the present disclosure, the data processing task capacity is a capacity of a wireless device (e.g., one of the plurality of vehicles 12) to perform computation and/or communication tasks. The data processing task capacity may include a computation capacity and a communication capacity. In the scope of the present disclosure, the computation capacity is a capacity of the wireless device to perform computation tasks (e.g., storage/retrieval of data in memory, mathematical calculations, execution of algorithms such as, for example, machine learning algorithms, computer vision algorithms, and/or the like).

In the scope of the present disclosure, the communication capacity is the capacity of the wireless device to perform communication tasks (e.g., wireless and/or wired transmission/reception of data). In the scope of the present disclosure, capacity refers to a total amount of tasks which may be simultaneously processed. In a non-limiting example, computation capacity is measured in, for example, floating point operations per second, instructions per second, and/or the like. In a non-limiting example, communication capacity is measured in, for example, bits per second or the like.

In an exemplary embodiment, each of the plurality of vehicles 12 determines the computation capacity of the vehicle controller 20 of the vehicle system 14 and the communication capacity of the vehicle communication system 24 of the vehicle system 14. In a non-limiting example, the computation capacity is determined based at least in part on a quantity and/or characteristics of one or more computational tasks currently being executed by the vehicle controller 20. In a non-limiting example, the communication capacity is determined based at least in part on a quantity and/or characteristics of one or more communication tasks currently being performed by the vehicle communication system 24.

In another non-limiting example, the data processing task capacity is determined using a capacity estimation machine learning model executed by the vehicle controller 20 of each of the plurality of vehicles 12. In a non-limiting example, the capacity estimation machine learning model includes multiple layers, including an input layer and an output layer, as well as one or more hidden layers. The input layer receives physical computation capabilities of the vehicle controller 20 (e.g., a maximum floating point operations per second of the vehicle controller 20), physical communication capabilities of the vehicle communication system 24 (e.g., a maximum bits per second of the vehicle communication system 24), characteristics of one or more computational tasks currently executed by the vehicle controller 20, and characteristics of one or more communication tasks currently performed by the vehicle communication system 24 as inputs. The inputs are then passed on to the hidden layers. Each hidden layer applies a transformation (e.g., a non-linear transformation) to the data and passes the result to the next hidden layer until the final hidden layer. The output layer produces the data processing task capacity.

To train the capacity estimation machine learning model, a dataset of inputs and their corresponding data processing task capacity is used. The model is trained by adjusting internal weights between nodes in each hidden layer to minimize prediction error. During training, an optimization technique (e.g., gradient descent) is used to adjust the internal weights to reduce the prediction error. The training process is repeated with the entire dataset until the prediction error is minimized, and the resulting trained model is then used to process new input data.

After sufficient training of the capacity estimation machine learning model, the model is capable of accurately and precisely determining data processing task capacity based on physical computation capabilities of the vehicle controller 20, physical communication capabilities of the vehicle communication system 24, characteristics of one or more computational tasks currently executed by the vehicle controller 20, and characteristics of one or more communication tasks currently performed by the vehicle communication system 24. By adjusting the weights between the nodes in each hidden layer during training, the model "learns" to recognize patterns in the data that are indicative of the data processing task capacity.

In some exemplary embodiments, each of the plurality of vehicles 12 determines the data processing task capacity and broadcasts the data processing task capacity using the vehicle communication system 24. In other exemplary embodiments, one or more of the plurality of vehicles 12 acts as a host device and remotely determines the data processing task capacity of each of the plurality of vehicles 12. In another exemplary embodiment, the server system 30 remotely determines the data processing task capacity of each of the plurality of vehicles 12. After block 104, the method 100 proceeds to block 112, as will be discussed in greater detail below.

At block 106, a historic performance reliability of each of the plurality of vehicles 12 is determined. In the scope of the present disclosure, the historic performance reliability quantifies a variance in performance and/or reliability of a wireless device (e.g., one of the plurality of vehicles 12) for performing computation and/or communication tasks. In a non-limiting example, the historic performance reliability includes metrics such as, for example, a computational system uptime and/or availability rate, a statistical variance in computation capacity, a network jitter, a network availability rate, a network dropped packet rate, and/or the like. In an exemplary embodiment, the historic performance reliability includes a weighted average of one or more of the aforementioned metrics.

In some exemplary embodiments, each of the plurality of vehicles 12 determines the historic performance reliability and broadcasts the historic performance reliability using the vehicle communication system 24. In other exemplary embodiments, one or more of the plurality of vehicles 12 acts as a host device and remotely determines the historic performance reliability of each of the plurality of vehicles 12. In another exemplary embodiment, the server system 30 remotely determines the historic performance reliability of each of the plurality of vehicles 12. After block 106, the method 100 proceeds to block 112, as will be discussed in greater detail below.

At block 108, a scheduled data processing task capacity for each of the plurality of vehicles 12 is determined. In the scope of the present disclosure, the scheduled data processing task capacity is a predicted future data processing task capacity of each of the plurality of vehicles 12 based on scheduled or predicted usage. In a non-limiting example, known and/or scheduled future events such as over the air (OTA) updates, system backups, network downtime, and/or the like may affect the scheduled data processing task capacity. In another non-limiting example, characteristics of currently executed tasks may affect the scheduled data processing task capacity. For example, if the currently executed tasks include downloading an OTA update, the predicted future data processing task capacity may account for computational load due to installation of the update after the download task is completed.

In an exemplary embodiment, the scheduled data processing task capacity is determined using a capacity prediction machine learning model. In a non-limiting example, the capacity prediction machine learning model includes multiple layers, including an input layer and an output layer, as well as one or more hidden layers. The input layer receives current data processing task capacity, known future events and/or tasks, characteristics of currently executed tasks, and/or the like as inputs. The inputs are then passed on to the hidden layers. Each hidden layer applies a transformation (e.g., a non-linear transformation) to the data and passes the result to the next hidden layer until the final hidden layer. The output layer produces the scheduled data processing task capacity.

To train the capacity prediction machine learning model, a dataset of inputs and their corresponding scheduled data processing task capacity is used. The model is trained by adjusting internal weights between nodes in each hidden layer to minimize prediction error. During training, an optimization technique (e.g., gradient descent) is used to adjust the internal weights to reduce the prediction error. The training process is repeated with the entire dataset until the prediction error is minimized, and the resulting trained model is then used to process new input data.

After sufficient training of the capacity prediction machine learning model, the model is capable of accurately and precisely determining scheduled data processing task capacity based on current data processing task capacity, known future events and/or tasks, characteristics of currently executed tasks, and/or the like. By adjusting the weights between the nodes in each hidden layer during training, the model "learns" to recognize patterns in the data that are indicative of scheduled data processing task capacity.

In some exemplary embodiments, each of the plurality of vehicles 12 determines the scheduled data processing task capacity and broadcasts the scheduled data processing task capacity using the vehicle communication system 24. In other exemplary embodiments, one or more of the plurality of vehicles 12 acts as a host device and remotely determines the scheduled data processing task capacity of each of the plurality of vehicles 12. In another exemplary embodiment, the server system 30 remotely determines the scheduled data processing task capacity of each of the plurality of vehicles 12. After block 108, the method 100 proceeds to block 112, as will be discussed in greater detail below.

At block 110, a cost for each of the plurality of vehicles 12 is determined. In the scope of the present disclosure, the cost represents an expected monetary cost for establishing and transferring data using a wireless connection.

In an exemplary embodiment, the cost is determined using a cost function:

$$t_c = (t_0 * z) + P_0 = \frac{r_{c,Mb}}{r_{c,total}} * \sum \frac{bool(\text{ignition state})}{p_l * n * \tau_u} \quad (1)$$

$$t_0 = \frac{\frac{r_{c,Mb}}{c_{c,Mb}}}{i} * \int i(t)dt \quad (2)$$

In Equation (1), $t_c$ is the cost, $t_0$ is a quantity of interactions allowed within a given time period (e.g., one day) without exceeding a device low power limit, z is a total cost of performing $t_0$ interactions within the given time period, $P_0$ is a cost per unit of power consumed within the given time period, $r_{c,Mb}$ is a cost of transferring one megabyte of registration information within the given time period, $r_{c,total}$ is a total registration cost, bool(ignition state) is defined as one (i.e., true) if the vehicle is in an ignition off state and zero (i.e., false) if the vehicle is in an ignition on state, $p_l$ is the device low power limit (i.e., a power consumption allowed within the given time period), n is a number of reconnections within the given time period, and $\tau_u$, is a duty cycle of a registration process (i.e., a time required to perform the registration process as a fraction of the given time period). In Equation (1), the quantity $$\frac{bool(\text{ignition state})}{p_l * n * \tau_u}$$

is summed for one or more devices in the vehicle which may consume power to establish a connection (e.g., one or more controllers of the vehicle). Furthermore, in Equation (2), $c_{c,Mb}$ is a cost of transferring one megabyte of payload data within the given time period, i is a quantity of interactions performed within the given time period, and $\int i(t)dt$ is the integral of i evaluated over multiple time periods (e.g., fourteen days).

In the scope of the present disclosure, establishing a wireless connection between multiple devices includes a registration process. The registration process sets up the connection between devices and includes transmission of registration information. In a non-limiting example, the registration information includes, for example, device identifying data, handshake data, security data, connection parameters, and/or the like. After completion of the registration process, payload data may be transmitted using the wireless connection. In a non-limiting example, payload data may include, for example, the computation task, as discussed above. In the scope of the present disclosure, an interaction is any wireless connection between two or more devices which includes at least transmission of payload data. In the scope of the present disclosure, the device low power limit is a power consumption allowed for a given device within the given time period. In a non-limiting example, the device low power limit may be determined based at least in part on an energy budget (i.e., a total amount of energy consumption allowed within the given time period)

In another exemplary embodiment, the cost is determined using a cost determination machine learning model. In a non-limiting example, the cost determination machine learning model includes multiple layers, including an input layer and an output layer, as well as one or more hidden layers. The input layer receives device power consumption, power cost, and data transfer cost information as inputs. The inputs are then passed on to the hidden layers. Each hidden layer applies a transformation (e.g., a non-linear transformation) to the data and passes the result to the next hidden layer until the final hidden layer. The output layer produces the cost.

To train the cost determination machine learning model, a dataset of inputs and their corresponding cost is used. The model is trained by adjusting internal weights between nodes in each hidden layer to minimize prediction error. During training, an optimization technique (e.g., gradient descent) is used to adjust the internal weights to reduce the prediction error. The training process is repeated with the entire dataset until the prediction error is minimized, and the resulting trained model is then used to process new input data.

After sufficient training of the cost determination machine learning model, the model is capable of accurately and precisely determining cost based on device power consumption, power cost, and data transfer cost information. By adjusting the weights between the nodes in each hidden layer during training, the model "learns" to recognize patterns in the data that are indicative of cost.

In some exemplary embodiments, each of the plurality of vehicles 12 determines the cost and broadcasts the cost using the vehicle communication system 24. In other exemplary embodiments, one or more of the plurality of vehicles 12 acts as a host device and remotely determines the cost of each of the plurality of vehicles 12. In another exemplary embodiment, the server system 30 remotely determines the cost of each of the plurality of vehicles 12. After block 110, the method 100 proceeds to block 112.

At block 112, a leader matrix is determined. In the scope of the present disclosure, the leader matrix is a ranked list including one or more candidate leader vehicles (also referred to as candidate leader devices). Each of the one or more candidate leader vehicles is selected from the plurality of vehicles 12. The one or more candidate leader vehicles are selected and a ranking order of the leader matrix is determined based at least in part on at least one of: the data processing task capacity of each of the plurality of vehicles 12 determined at block 104, the historic performance reliability of each of the plurality of vehicles 12 determined at block 106, the scheduled data processing task capacity for each of the plurality of vehicles 12 determined at block 108, and the cost for each of the plurality of vehicles 12 determined at block 110.

In an exemplary embodiment, each of the one or more candidate leader vehicles is selected based on performance thresholds. In a non-limiting example, the one or more candidate leader vehicles are selected as one or more of the plurality of vehicles 12 having a data processing task capacity greater than or equal to a predetermined data processing task capacity threshold. In another non-limiting example, the one or more candidate leader vehicles are selected as one or more of the plurality of vehicles 12 further having a historic performance reliability greater than or equal to a predetermined historic performance reliability threshold.

In another exemplary embodiment, each of the one or more candidate leader vehicles is selected using a machine learning model. In a non-limiting example, the one or more candidate leader vehicles are selected using a candidate selection machine learning model trained to select one or more candidate leader vehicles based at least in part on at least one of: the data processing task capacity of each of the plurality of vehicles 12 determined at block 104, the historic performance reliability of each of the plurality of vehicles 12 determined at block 106, the scheduled data processing task capacity for each of the plurality of vehicles 12 determined at block 108, and the cost for each of the plurality of vehicles 12 determined at block 110.

In an exemplary embodiment, the ranking order of the leader matrix is determined based on performance metrics. In a non-limiting example, the ranking order of the leader matrix is determined such that candidate vehicles having a higher data processing task capacity are ranked higher (i.e., closer to the first position) in the leader matrix. In another non-limiting example, the ranking order of the leader matrix is determined such that candidate vehicles having a higher historic performance reliability are ranked higher (i.e., closer to the first position) in the leader matrix. In another non-limiting example, the ranking order of the leader matrix is determined such that candidate vehicles having a higher scheduled data processing task capacity are ranked higher (i.e., closer to the first position) in the leader matrix. In another non-limiting example, the ranking order of the leader matrix is determined such that candidate vehicles having a lower cost are ranked higher (i.e., closer to the first position) in the leader matrix.

In another exemplary embodiment, the ranking order of the leader matrix is determined using a machine learning model. In a non-limiting example, the ranking order of the leader matrix is determined using a candidate ranking machine learning model trained to rank the one or more candidate leader vehicles based at least in part on at least one of: the data processing task capacity of each of the plurality of vehicles 12 determined at block 104, the historic performance reliability of each of the plurality of vehicles 12 determined at block 106, the scheduled data processing task capacity for each of the plurality of vehicles 12 determined at block 108, and the cost for each of the plurality of vehicles 12 determined at block 110.

In some exemplary embodiments, each of the plurality of vehicles 12 determines the leader matrix and broadcasts the leader matrix using the vehicle communication system 24. In other exemplary embodiments, one or more of the plurality of vehicles 12 acts as a host device and remotely determines the leader matrix. In another exemplary embodiment, the server system 30 remotely determines the leader matrix. After block 112, the method 100 proceeds to block 114.

At block 114, a first leader vehicle **12*a* is selected from the leader matrix determined at block 112. In an exemplary embodiment, the first leader vehicle 12*a* is selected to be the highest ranked candidate vehicle (i.e., the candidate vehicle in the first position) in the leader matrix. In some exemplary embodiments, each of the plurality of vehicles 12 determines the first leader vehicle 12*a* and broadcasts the first leader vehicle 12*a* using the vehicle communication system 24. In other exemplary embodiments, one or more of the plurality of vehicles 12 acts as a host device and remotely determines the first leader vehicle 12*a*. In another exemplary embodiment, the server system 30 remotely determines the first leader vehicle 12*a*. After block 114, the method 100 proceeds to block 116**.

At block 116, the first leader vehicle **12*a* selected at block 114 establishes a first wireless connection with one or more of the first and second follower vehicles 12*b*, 12*c*. In an exemplary embodiment, the first wireless connection is a local area connection, such as, for example, a BLUETOOTH connection, a near-field communication (NFC) connection, a wireless local area network (WLAN/WiFi) connection, a short-range radio connection, and/or the like. It should be understood that the first wireless connection may utilize any connection protocol configured for peer-to-peer connections between wireless devices. After establishing the first wireless connection, the one or more of the first and second follower vehicles 12*b*, 12*c* transfers a follower data processing task to the first leader vehicle 12*a***. In an exemplary embodiment, the follower data processing task includes at least one of: a computation task and a communication task.

In the scope of the present disclosure, the computation task includes, for example, storage/retrieval of data in memory, mathematical calculations, execution of algorithms such as, for example, machine learning algorithms, computer vision algorithms, video encoding algorithms and/or the like. In a non-limiting example, the computation task includes an offloading optimization computation task. In the scope of the present disclosure, the offloading optimization computation task includes execution of an algorithm configured to determine which (if any) computation and/or communication tasks should be offloaded from the one or more of the first and second follower vehicles **12*b*, 12*c* to the first leader vehicle 12*a*** in order to optimize performance, resource use, and/or the like. In an exemplary embodiment, the offloading optimization computation task is a deterministic, rule-based algorithm. In another exemplary embodiment, the offloading optimization computation task is a vehicle specific offloading machine learning model. An example, of a vehicle specific offloading machine learning model is discussed in U.S. application Ser. No. 18/461,682, titled "ALLOCATING COMPUTING RESOURCES FOR A VEHICLE APPLICATION", filed on Sep. 6, 2023, the entire contents of which is hereby incorporated by reference.

In the scope of the present disclosure, the communication task includes, for example, transmission and/or reception of data. In a non-limiting example, the communication task includes a server uplink communication task. In the scope of the present disclosure, the server uplink communication task includes upload and/or download of data to/from the server system 30. For example, the server uplink communication task may include upload of telemetry data from one or more of the first and second follower vehicles 12*b*, 12*c*. In another example, the server uplink communication task may include download of an over the air (OTA) update for one or more of the first and second follower vehicles 12*b*, 12*c*. After block 116, the method 100 proceeds to block 118.

At block 118, the first leader vehicle 12*a* performs the follower data processing task received at block 116. In an exemplary embodiment, to perform the communication task, vehicle controller 20 of the first leader vehicle 12*a* uses the vehicle communication system 24 to establish a second wireless connection between the first leader vehicle 12*a* and the server system 30. In an exemplary embodiment, the second wireless connection is a wide area connection, such as, for example, a cellular data connection or the like. It should be understood that the second wireless connection may utilize any connection protocol configured for medium- and/or long-range connections between devices. After establishing the second wireless connection, the first leader vehicle 12*a* uploads performs the communication task (e.g., the server uplink communication task), as discussed above. After block 118, the method 100 proceeds to enter a standby state at block 120.

In an exemplary embodiment, the method 100 repeatedly exits the standby state 120 and restarts the method 100 at block 102. In a non-limiting example, the method 100 is restarted on a timer, for example, every three hundred milliseconds.

Figure 3:
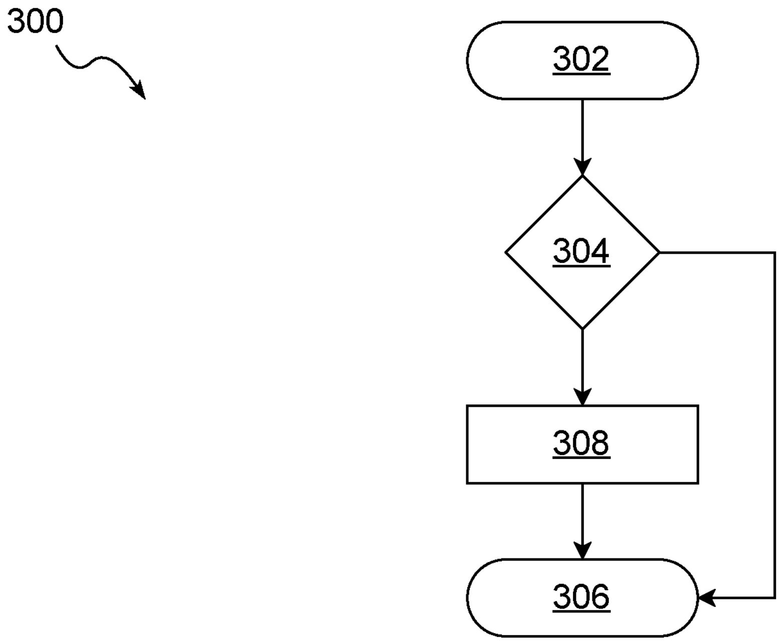
FIG. 3 is a flowchart of a method for mitigating obstructions, according to an exemplary embodiment.

Referring to FIG. 3, a flowchart of a method 300 for mitigating obstructions is shown. The method 300 begins at block 302 and proceeds to block 304. At block 304, an obstruction impeding transmission between one of the first and second follower vehicles 12*b*, 12*c* and the first leader vehicle 12*a* is identified. In the scope of the present disclosure, an obstruction includes any condition which hinders transmission, including, for example, a physical obstruction (e.g., an interloping vehicle, building, and/or the like), an electromagnetic obstruction (e.g., network/wireless interference), a hardware obstruction (e.g., equipment malfunction/failure), and/or the like. In an exemplary embodiment, the obstruction is identified based on network transmission metrics, including, for example, an increase in dropped packets, an increase in network latency, a decrease in transmission speed, a decrease in transmission bandwidth, and/or the like. If no obstruction is identified at block 304, the method 300 proceeds to enter a standby state at block 306. If an obstruction is identified at block 304, the method 300 proceeds to block 308.

At block 308, in a first exemplary embodiment, the follower data processing task is relayed from one of the first and second follower vehicles 12*b*, 12*c* through the other of the first and second follower vehicles 12*b*, 12*c* (i.e., from the first follower vehicle 12*b* through the second follower vehicle 12*c* or from the second follower vehicle 12*c* through the first follower vehicle 12*b*) to the first leader vehicle 12*a* to avoid the obstruction identified at block 304. In an exemplary embodiment, direct communication between the first follower vehicle 12*b* and the first leader vehicle 12*a* is obstructed, but direct communication between the first follower vehicle 12*b* and the second follower vehicle 12*c* is not obstructed. Furthermore, communication between the second follower vehicle 12*c* and the first leader vehicle 12*a* is not obstructed. Therefore, the follower data processing task may be relayed from the first follower vehicle 12*b* to the second follower vehicle 12*c* and subsequently from the second follower vehicle 12*c* to the first leader vehicle 12*a* to avoid the obstruction.

In another exemplary embodiment, the first leader vehicle 12*a* terminates communication with the obstructed follower vehicle (i.e., one of the first and second follower vehicles 12*b*, 12*c*) in response to identifying the obstruction if no other follower vehicle is available to relay the follower data processing task. After block 308, the method 300 proceeds to enter the standby state at block 306.

In an exemplary embodiment, the method 300 is periodically executed by one or more of the plurality of vehicles 12 before, during, and/or after execution of the method 100 discussed above. In a non-limiting example, the method 300 repeatedly exits the standby state 306 and restarts the method 300 at block 302. In a non-limiting example, the method 300 is restarted on a timer, for example, every three hundred milliseconds.

Figure 4:
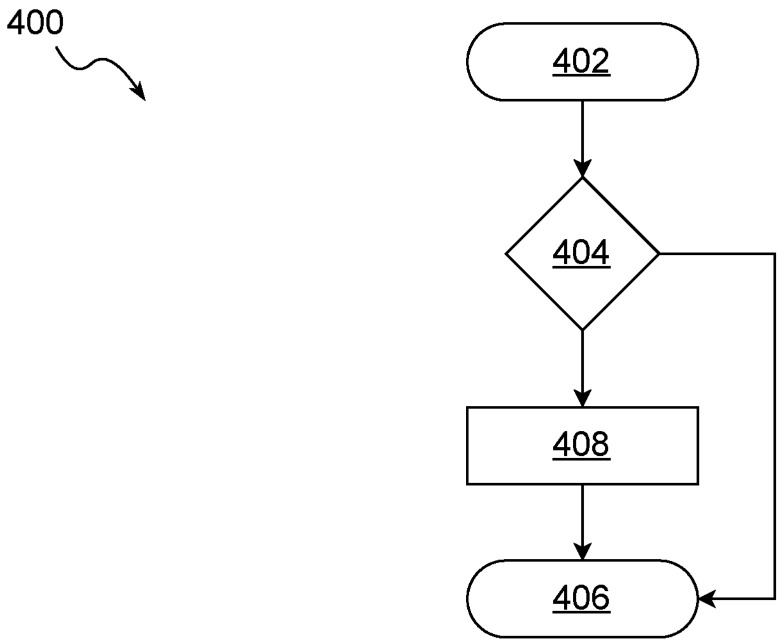
FIG. 4 is a flowchart of a method for selecting a delegate leader device, according to an exemplary embodiment.

Referring to FIG. 4, a flowchart of a method 400 for selecting a delegate leader vehicle is shown. The method 400 begins at block 402 and proceeds to block 404. At block 404, in a first exemplary embodiment, the data processing task capacity of the first leader vehicle 12*a* is re-evaluated, as discussed in reference to block 104 above. In a second exemplary embodiment, a power supply capacity of the first leader vehicle 12*a* over time is evaluated. In a non-limiting example, a power supply capacity degradation is determined. In the scope of the present disclosure, the power supply capacity degradation is a decrease in power supplied by the first leader vehicle 12*a* over a predetermined time period (e.g., one minute) as a percentage of initial power supplied. In a third exemplary embodiment, a remaining energy budget of the first leader vehicle 12*a* is evaluated. In a non-limiting example, the energy budget is a total amount of energy consumption allowed within a given time period.

In an exemplary embodiment, if the data processing task capacity is greater than or equal to the predetermined data processing task capacity threshold OR if the power supply capacity degradation is less than a predetermined power supply capacity degradation threshold OR if the remaining energy budget is greater than a predetermined remaining energy budget threshold, the method 400 proceeds to enter a standby state at block 406. If the data processing task capacity is less than the predetermined data processing task capacity threshold OR the power supply capacity degradation is greater than or equal to the predetermined power supply capacity degradation threshold OR the remaining energy budget is less than or equal to the predetermined remaining energy budget threshold, the method 400 proceeds to block 408.

At block 408, the follower data processing task is transferred to a second leader vehicle. In an exemplary embodiment, the second leader vehicle is selected from the leader matrix determined at block 112. In an exemplary embodiment, the second leader vehicle is selected to be the highest ranked candidate vehicle in the leader matrix besides the first leader vehicle 12*a*. In a non-limiting example, the second leader vehicle is selected to be one of the first follower vehicle 12*b* and the second follower vehicle 12*c*. In an exemplary embodiment, the follower data processing task is transferred to the second leader vehicle using a local area connection, such as, for example, a BLUETOOTH connection, a near-field communication (NFC) connection, a wireless local area network (WLAN/WiFi) connection, a short-range radio connection, and/or the like. After block 408, the method 400 proceeds to enter the standby state at block 406.

In an exemplary embodiment, the method 400 is periodically executed by one or more of the plurality of vehicles 12 before, during, and/or after execution of the method 100 discussed above. In a non-limiting example, the method 400 repeatedly exits the standby state 406 and restarts the method 400 at block 402. In a non-limiting example, the method 400 is restarted on a timer, for example, every three hundred milliseconds.

The system 10 and methods 100, 300, 400 of the present disclosure offer several advantages. For example, devices with reduced communication capability (e.g., devices having only short-range communication capability) may establish communication with the server system 30 via a leader device. Furthermore, devices with reduced computation capability may transfer computation tasks to a leader device having increased computation capability. Additionally, tasks may be transferred to a leader device having a more efficient, more reliable, and/or more performant connection to the server system 30, resulting in improved performance and reduced resource use.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for network resource optimization, the method comprising:

selecting a first leader device from a plurality of wireless devices in wireless communication, wherein the first leader device is in wireless communication with at least one follower device of the plurality of wireless devices, wherein selecting the first leader device further comprises:

determining a leader matrix, wherein the leader matrix includes one or more candidate leader devices, wherein each of the one or more candidate leader devices is one of the plurality of wireless devices, wherein the leader matrix is determined based at least in part on at least one of: a data processing task capacity of each of the plurality of wireless devices and a historic performance reliability of each of the plurality of wireless devices, wherein the leader matrix is a ranked list including each of the one or more candidate leader devices, and wherein a ranking order of the leader matrix is determined based at least in part on the data processing task capacity and the historic performance reliability of each of the one or more candidate leader devices, and wherein determining the leader matrix further comprises:

determining the data processing task capacity of each of the plurality of wireless devices, wherein the data processing task capacity of each of the plurality of wireless devices is determined using a capacity estimation machine learning model, and wherein the data processing task capacity includes at least one of: a computation capacity and a communication capacity:

determining the historic performance reliability of each of the plurality of wireless devices;

selecting the one or more candidate leader devices from the plurality of wireless devices based at least in part on the data processing task capacity of each of the plurality of wireless devices and the historic performance reliability of each of the plurality of wireless devices; and determining the leader matrix based at least in part on the one or more candidate leader devices; and selecting the first leader device from the leader matrix, wherein selecting the first leader device from the leader matrix further comprises:

determining a scheduled data processing task capacity for each of the one or more candidate leader devices, wherein the scheduled data processing task capacity of each of the one or more candidate leader devices is determined using a capacity prediction machine learning model; and determining the ranking order of the leader matrix based at least in part on the scheduled data processing task capacity for each of the one or more candidate leader devices;

transferring a follower data processing task from the at least one follower device to the first leader device, wherein the follower data processing task includes at least one of: a computation task and a communication task; and performing the follower data processing task using the first leader device.

2. The method of claim 1, wherein determining the leader matrix further comprises:

calculating a cost for each of the one or more candidate leader devices using a cost function:

$$t_c = (t_0 * z) + P_0$$

$$t_0 = \frac{\frac{r_{c,Mb}}{c_{c,Mb}}}{i} * \int i(t)dt$$

wherein $t_c$ is the cost, $t_0$ is a quantity of interactions allowed within a given time period without exceeding a device low power limit, z is a total cost of performing $t_0$ interactions within the given time period, $P_0$ is a cost per unit of power consumed within the given time period, $r_{c,Mb}$ is a cost of transferring one megabyte of registration information within the given time period, $c_{c,Mb}$ is a cost of transferring one megabyte of payload data within the given time period, i is a quantity of interactions performed within the given time period, and $\int i(t)dt$ is an integral of i evaluated over multiple time periods; and determining the ranking order of the leader matrix based at least in part on the cost for each of the one or more candidate leader devices.

3. The method of claim 1, wherein transferring the follower data processing task further comprises:

transferring the computation task from the at least one follower device to the first leader device, wherein the computation task includes an offloading optimization computation task; and transferring the communication task from the at least one follower device to the first leader device, wherein the communication task includes a server uplink communication task.

4. The method of claim 3, wherein transferring the follower data processing task further comprises:

identifying an obstruction impeding transmission between a first follower device and the first leader device; and relaying the follower data processing task from the first follower device through a second follower device to the first leader device to avoid the obstruction.

5. The method of claim 3, wherein transferring the computation task further comprises:

transferring the offloading optimization computation task from the at least one follower device to the first leader device, wherein the offloading optimization computation task includes execution of a device specific offloading machine learning model.

6. The method of claim 1, wherein performing the follower data processing task further comprises:

determining a data processing task capacity of the first leader device; and transferring the follower data processing task to a second leader device based at least in part on the data processing task capacity of the first leader device.

7. A system for network resource optimization for a vehicle, the system comprising:

a first follower vehicle including:

a follower vehicle communication system; and a follower vehicle controller in electrical communication with the follower vehicle communication system, wherein the follower vehicle controller is programmed to:

establish a first wireless connection with a leader vehicle using the follower vehicle communication system, wherein to establish the first wireless connection with the leader vehicle, the follower vehicle controller is further programmed to:

determine a leader matrix, wherein the leader matrix includes one or more candidate leader vehicles, wherein the leader matrix is determined based at least in part on at least one of: a data processing task capacity of each of a plurality of vehicles and a historic performance reliability of each of the plurality of vehicles, and wherein to determine the leader matrix, the follower vehicle controller is further programmed to:

determine the data processing task capacity of each of a plurality of vehicles, wherein the data processing task capacity of each of the plurality of vehicles is determined using a capacity estimation machine learning model, and wherein the data processing task capacity includes at least one of: a computation capacity and a communication capacity;

determine the historic performance reliability of each of the plurality of vehicles;

select the one or more candidate leader vehicles from the plurality of vehicles based at least in part on the data processing task capacity of each of the plurality of vehicles and the historic performance reliability of each of the plurality of vehicles; and determine the leader matrix based at least in part on the one or more candidate leader vehicles, wherein the leader matrix is a ranked list including each of the one or more candidate leader vehicles, and wherein a ranking order of the leader matrix is determined based at least in part on the data processing task capacity and the historic performance reliability of each of the one or more candidate leader vehicles; and select the leader vehicle from the leader matrix, wherein to select the leader vehicle from the leader matrix, the follower vehicle controller is further programmed to:

determine a scheduled data processing task capacity for each of the one or more candidate leader vehicles, wherein the scheduled data processing task capacity of each of the one or more candidate leader vehicles is determined using a capacity prediction machine learning model;

calculate a cost for each of the one or more candidate leader vehicles using a cost function:

$$t_c = (t_0 * z) + P_0$$

$$t_0 = \frac{\frac{r_{c,Mb}}{c_{c,Mb}}}{i} * \int i(t)dt$$

wherein $t_c$ is the cost, $t_0$ is a quantity of interactions allowed within a given time period without exceeding a device low power limit, z is a total cost of performing $t_0$ interactions within the given time period, $P_0$ is a cost per unit of power consumed within the given time period, $r_{c,Mb}$ is a cost of transferring one megabyte of registration information within the given time period, $c_{c,Mb}$ is a cost of transferring one megabyte of payload data within the given time period, i is a quantity of interactions performed within the given time period, and $\int i(t)dt$ is an integral of i evaluated over multiple time periods; and determine the ranking order of the leader matrix based at least in part on the scheduled data processing task capacity for each of the one or more candidate leader vehicles and the cost for each of the one or more candidate leader vehicles; and transfer a follower data processing task to the leader vehicle using the follower vehicle communication system and the first wireless connection.

8. The system of claim 7, wherein to transfer the follower data processing task to the leader vehicle, the follower vehicle controller is further programmed to:

transfer an offloading optimization computation task to the leader vehicle using the follower vehicle communication system, wherein the offloading optimization computation task includes execution of a vehicle specific offloading machine learning model.

9. The system of claim 8, further comprising:

the leader vehicle including:

a leader vehicle communication system; and a leader vehicle controller in electrical communication with the leader vehicle communication system, wherein the leader vehicle controller is programmed to:

establish a first wireless connection with the first follower vehicle using the leader vehicle communication system;

receive a follower data processing task from the first follower vehicle using the leader vehicle communication system and the first wireless connection;

establish a second wireless connection with a server system using the leader vehicle communication system; and perform the follower data processing task using the leader vehicle communication system and the second wireless connection.

10. The system of claim 9, wherein to receive the follower data processing task from the first follower vehicle, the leader vehicle controller is further programmed to:

identify an obstruction impeding transmission between the first follower vehicle and the leader vehicle; and terminate the first wireless connection between the leader vehicle and the first follower vehicle in response to identifying the obstruction.

11. A method for network resource optimization for a vehicle, the method comprising:

selecting a first leader vehicle from a plurality of vehicles in wireless communication, wherein the first leader vehicle is in wireless communication with at least one follower vehicle of the plurality of vehicles, wherein selecting the first leader vehicle further comprises:

determining a leader matrix, wherein the leader matrix includes one or more candidate leader vehicles, wherein each of the one or more candidate leader vehicles is one of the plurality of vehicles, wherein the leader matrix is determined based at least in part on at least one of: a data processing task capacity of each of the plurality of vehicles and a historic performance reliability of each of the plurality of vehicles, and wherein determining the leader matrix further comprises:

determining the data processing task capacity of each of the plurality of vehicles, wherein the data processing task capacity of each of the plurality of vehicles is determined using a capacity estimation machine learning model, and wherein the data processing task capacity includes at least one of: a computation capacity and a communication capacity;

determining the historic performance reliability of each of the plurality of vehicles;

selecting the one or more candidate leader vehicles from the plurality of vehicles based at least in part on the data processing task capacity of each of the plurality of vehicles and the historic performance reliability of each of the plurality of vehicles;

calculating a cost for each of the one or more candidate leader vehicles using a cost function:

$$t_c = (t_0 * z) + P_0$$

$$t_0 = \frac{\frac{r_{c,Mb}}{c_{c,Mb}}}{i} * \int i(t)dt$$

wherein $t_c$ is the cost, $t_0$ is a quantity of interactions allowed within a given time period without exceeding a device low power limit, z is a total cost of performing $t_0$ interactions within the given time period, $P_0$ is a cost per unit of power consumed within the given time period, $r_{c,Mb}$ is a cost of transferring one megabyte of registration information within the given time period, $c_{c,Mb}$ is a cost of transferring one megabyte of payload data within the given time period, i is a quantity of interactions performed within the given time period, and $\int i(t)dt$ is an integral of i evaluated over multiple time periods; and determining the leader matrix based at least in part on the one or more candidate leader vehicles, wherein the leader matrix is a ranked list including each of the one or more candidate leader vehicles, and wherein a ranking order of the leader matrix is determined based at least in part on the data processing task capacity, the historic performance reliability of each of the one or more candidate leader vehicles, and the cost for each of the one or more candidate leader vehicles; and selecting the first leader vehicle from the leader matrix;

transferring a follower data processing task from the at least one follower vehicle to the first leader vehicle, wherein the follower data processing task includes execution of a vehicle specific offloading machine learning model; and performing the follower data processing task using the first leader vehicle.

* * * * *